June 17, 1969  J. H. MERCIER ET AL  3,450,163
PRESSURE VESSELS
Filed July 21, 1966
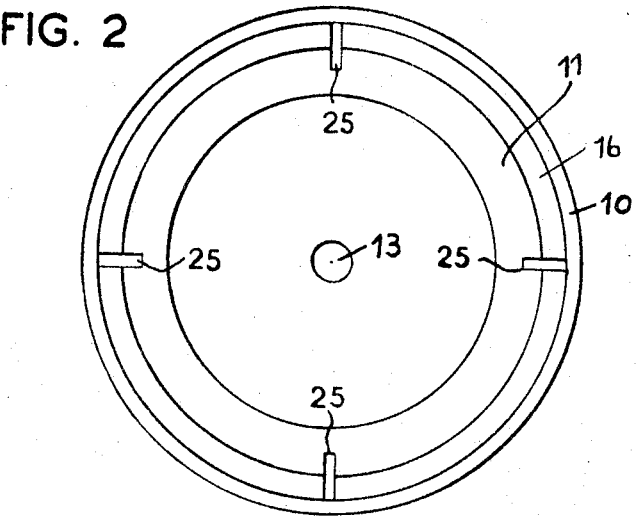
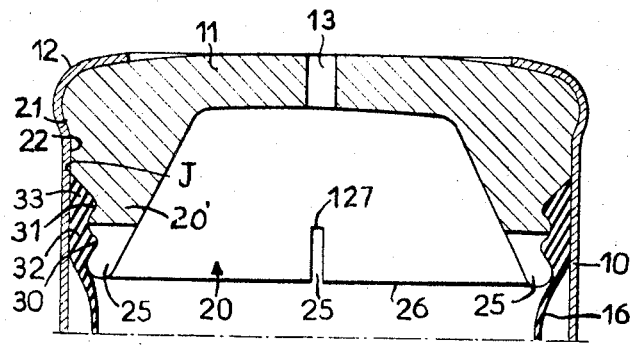
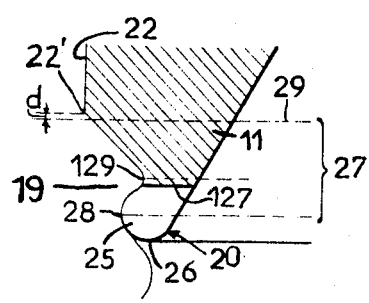
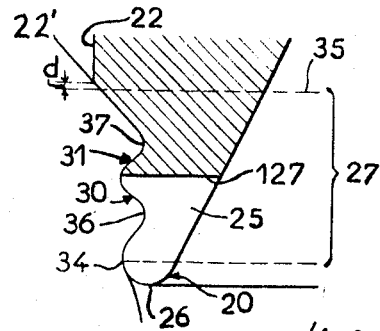
INVENTORS
JACQUES H. MERCIER
CARLO CORBELLINI
BY
ATTORNEY

United States Patent Office 3,450,163
Patented June 17, 1969

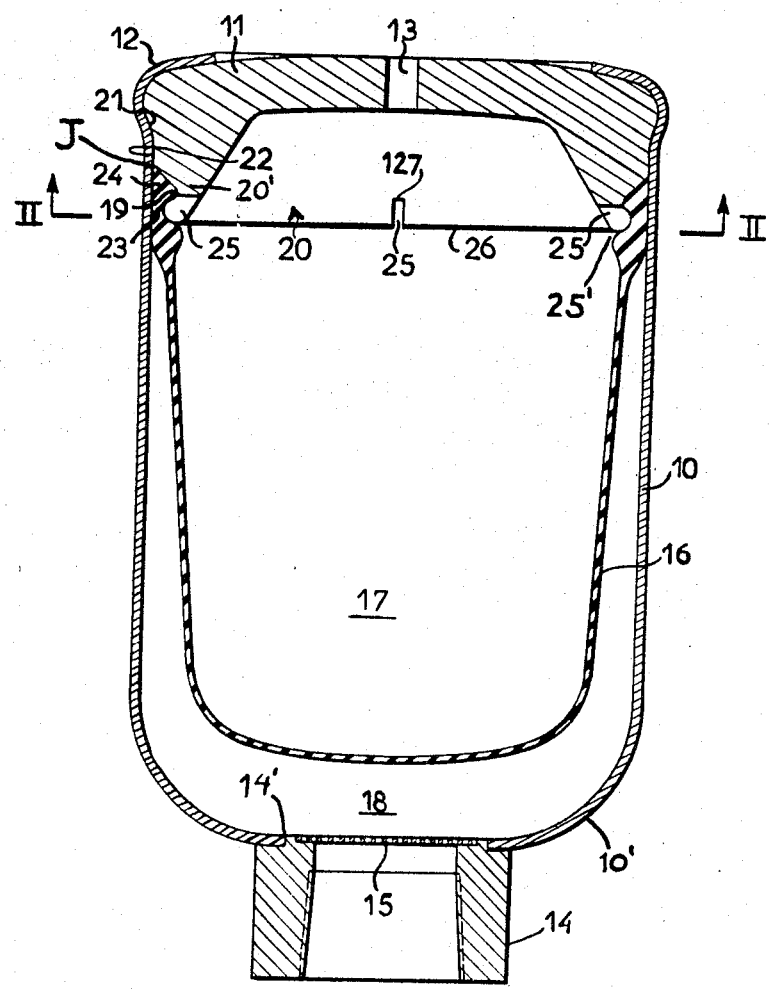

3,450,163
PRESSURE VESSELS
Jacques H. Mercier, New York, N.Y., and Carlo Corbellini, Paris, France, assignors to Olaer Patent Company, Walram, Luxembourg, a corporation of Luxembourg
Filed July 21, 1966, Ser. No. 566,913
Claims priority, application France, Aug. 2, 1965, 26,865
Int. Cl. F16l 55/04, 55/02
U.S. Cl. 138—30         5 Claims

ABSTRACT OF THE DISCLOSURE

This invention relates to the art of pressure vessels, more particularly of the type having a deformable bladder therein with a relatively large mount having a peripheral bead encompassing the depending cylindrical skirt of a cover member positioned in the correspondingly large mouth of the pressure vessel, the skirt being conformed so that the pressure in the bladder will react against the bead to force the latter into dependable sealing position with respect to the space between the wall of the pressure vessel and the adjacent surface of the skirt.

---

As conducive to an understanding of the invention, it is noted that where a pressure vessel is of the type comprising a container having a relatively large mouth in which a cylindrical cover member is positioned, the latter having a skirt with a depending portion spaced from the container wall and a deformable partition in the form of a bladder having a bead at the periphery thereof is positioned in such space with the head seated in an external annular groove in the depending portion of the skirt, so long as accurate tolerances are maintained, the bead will be held securely in place and provide a dependable seal. However, due to variations in the width of such space resulting from lack of concentricity during manufacture, irregularities in the materials and so forth, and also due to the stress of the material of the container in use, the bead will not be securerly retained in position with resultant leakage.

It is accordingly among the objects of the invention to provide a pressure vessel of the above type in which the bead will be dependably forced into effective sealing position even with relatively wide variations in the space between the wall of the container and the skirt which retains the bead in position and even with increases in the diameter of the container in operation of the unit due to the pressures involved.

According to the invention, these objects are accomplished by the arrangement and combination of elements hereinafter described and more particularly recited in the claims.

In the accompanying drawings in which are shown one or more of various possible embodiments of the several features of the invention, FIG. 1 is a longitudinal sectional view of a pressure vessel according to one embodiment of the invention, FIG. 2 is a transverse sectional view taken along lines II—II of FIG. 1, FIG. 3 is a view similar to FIG. 1 but consisting of a partial view of another embodiment of the invention, FIG. 4 is a fragmentary detail view on an enlarged scale of the embodiment of FIG. 1, and FIG. 5 is a view similar to FIG. 4 of the embodiment of FIG. 3.

Referring now to the drawings, in the embodiment shown in FIGS. 1 and 2, the pressure vessel comprises a container 10 of generally cylindrical shape which has an enlarged mouth and a closed lower end 10' with an axial port 14' across which extends a perforated plate 15. A sleeve or nipple 14 is secured to the end 10' and is axially aligned with port 14' to enable a suitable conduit to be secured thereto for flow of liquid into and out of the pressure vessel.

The mouth of the container is of slightly enlarged diameter as at 21 to define a rounded annular seat for the correspondingly rounded periphery of a cover member 11 which is retained in position as by crimping at 12, said cover member having an axial port 13 to receive a gas valve (not shown) for charging of the pressure vessel.

The cover member 11 supports a flexible separator or partition, preferably a bladder 16 of natural or synthetic rubber or similar material having like characteristics which intervenes between the ports 13 and 14' and divides the container into a gas chamber 17 and a liquid chamber 18.

The cover member 11 which is substantially cup-shaped, has a skirt 20 with a cylindrical guiding portion 22 of outer diameter substantially the same as that of the container and a cylindrical depending portion 20' which is of reduced diameter between the guiding portion 22 and the inner end 26 thereof, which preferably is rounded as shown, to define a space 23 with respect to the wall of the container 10.

The reduced diameter portion 20' of the cover member has an external annular groove 19 which receives an annular bead 24 at the mouth of the bladder 16, the diameter of said bladder mouth being slightly less than that of the depending portion 20' so that the bead 24 will be securely retained in the groove 19 to facilitate assembly.

Means are provided to afford communication between the chamber 17 and the portion of the groove 19 which is between the space 23 and the cylindrical guiding portion 22.

To this end, a plurality of slots 25 are provided in the lower end of the skirt 20 and more particularly in the illustrative embodiment shown, two diametrically opposed pairs of radial slots 25 are provided which extend through the rounded end 26.

As shown in FIG. 4, each of the slots 25 extends from the lower end 26 of skirt 20 to a point such that its upper edge 127 lies in a region 27 that extends from the lower edge 28 of groove 19 to near the lower edge 22' of guiding portion 22 as at 29. If the slot 25 did not extend past the lower edge 28 of groove 19 it would not permit the pressure in chamber 17 to react against the bead 24 and if it reached the lower edge 22' of portion 22, there would be danger of leakage of gas from the chamber 17.

The upper edge 127 of slot 25 could approach the lower edge 22' say a relatively small distance d as indicated by the limit line 29. However, in the preferred embodiment shown in FIGS. 1, 2 and 4, the upper edge 127 of each slot 25 is preferably close to the inner periphery or floor 129 of groove 19 above the lower edge 28 thereof.

It is apparent that the slots 25 may readily be formed as by two diametric sawings in the lower end 26 of skirt 20.

With the construction above described, the gas under pressure in chamber 17 will react against the bead 25 not only through the space 25' between the end 26 of the skirt 20 and the adjacent portion of the bladder 16, but also in an additional direction which tends to urge the bead 24 in a light wedge into the junction J defined between the edge 22' of surface 22 and the adjacent surface of the container 10, thereby securely retaining the bead of the bladder in position and providing a dependable seal.

The embodiment shown in FIGS. 3 and 5 is similar to that shown in FIGS. 1, 2 and 4 except that the skirt 20 has two annular grooves 30, 31, in its depending portion 20' and the bladder 16 has two beads 32, 33 adapted to snugly engage said grooves 30, 31.

In the manner previously described, slots 25 are provided in the skirt 20. As shown in FIG. 5, each of these slots extends from the lower end 26 of skirt 20 to a point such that its upper edge 127 lies in a region 27 that extends from the lower end 34 of the lowermost groove 30 to a point spaced from the cylindrical portion 22 by a small distance $d$. Preferably, the upper edge 127 of the slot 25 is located between the inner peripheries or floors 36, 37 of the grooves 30, 31.

With the arrangements above described, dependable retention of the mouth of the bladder and hence effective sealing action is provided, even with relatively wide tolerances in the dimensions of the depending portion 20' of the cover 11 and the cylindrical casing 10 due to imperfections of manufacture resulting in lack of concentricity and due to the stresses imparted in use of the pressure vessel.

More particularly, due to variations in pressure the diameter of the cylindrical container will vary to a greater or lesser extent depending upon the materials employed and the distance between the wall of the container 10 and the skirt 20 will vary. However, the force exerted by the pressure of the gas in the chamber 17 reacting through the slots 25 against the beads will force the latter into the junction J defined at the lower edge 22' of portion 22 to insure a tight seal even with relatively wide variations in the distance between the container wall and the skirt 20.

Having thus described our invention, what we claim as new and desire to secure by Letters Patent of the United States is:

1. A pressure vessel comprising a substantially cylindrical container having a port at one end and a mouth at the other, a cup-shaped cover member positioned in said mouth, said cover member having a top wall with a port and a cylindrical skirt, said skirt having a guiding portion adjacent said top wall of outer diameter substantially the same as the inner diameter of said container adjacent its mouth and a portion extending to its inner end of reduced outer diameter and spaced from the container wall, said reduced diameter portion having an annular groove on its outer surface, a deformable bladder in said container intervening between said ports, and defining a chamber on each side thereof, said bladder having a mouth at one end having a peripheral bead positioned in said annular groove, said skirt having a plurality of circumferentially spaced radial slots therein each extending therethrough from the inner end thereof to a point that lies in a region between the lower end of said annular groove and a point inwardly of the guiding portion of the skirt, said slots providing communication between said annular groove and the chamber defined between the bladder and the top wall of the cover member.

2. The combination set forth in claim 1 in which said radial slot extends to a point slightly below the inner periphery of said annular groove.

3. The combination set forth in claim 1 in which said annular groove extends from the guiding portion of said skirt and a junction is provided between the upper edge of said annular groove and the adjacent wall of said container, said bead being wedged into said junction by the fluid pressure through said passage means.

4. The combination set forth in claim 1 in which an additional annular groove is provided in said skirt between said first annular groove and the inner end of said skirt, said partition has an additional annular bead positioned in said additional groove, and said passage means comprises a rradial slot in said skirt extending from the inner end thereof to a point that lies in a region between the lower end of said additional annular groove and a point inwardly of the guiding portion of the skirt.

5. The combination set forth in claim 4 in which said radial slot extends to a point adjacent the lower end of the first annular groove.

References Cited
UNITED STATES PATENTS

| | | | |
|---|---|---|---|
| 3,137,317 | 6/1964 | Peters | 138—30 |
| 3,256,911 | 6/1966 | Mercier et al. | 138—30 |
| 3,288,168 | 11/1966 | Mercier et al. | 138—30 |
| 3,379,216 | 4/1968 | Mercier | 138—30 |

PATRICK D. LAWSON, *Primary Examiner.*